US012260238B2

(12) United States Patent
Sethi et al.

(10) Patent No.: US 12,260,238 B2
(45) Date of Patent: Mar. 25, 2025

(54) DEVICE DISCOVERY IN A VIRTUALIZED ENVIRONMENT

(71) Applicant: Dell Products L.P., Round Rock, TX (US)

(72) Inventors: Parminder Singh Sethi, Ludhiana (IN); Durai Singh, Chennai (IN); Suren Kumar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 1102 days.

(21) Appl. No.: 17/153,091

(22) Filed: Jan. 20, 2021

(65) Prior Publication Data

US 2022/0229681 A1    Jul. 21, 2022

(51) Int. Cl.
*G06F 9/455* (2018.01)
*H04L 41/122* (2022.01)
*H04L 61/5007* (2022.01)

(52) U.S. Cl.
CPC ........ *G06F 9/45558* (2013.01); *H04L 41/122* (2022.05); *H04L 61/5007* (2022.05); *G06F 2009/4557* (2013.01); *G06F 2009/45595* (2013.01)

(58) Field of Classification Search
CPC ........ G06F 9/45558; G06F 2009/4557; G06F 2009/45595; H04L 41/122; H04L 61/5007
See application file for complete search history.

(56) References Cited

U.S. PATENT DOCUMENTS

| | | | |
|---|---|---|---|
| 8,127,291 B2 * | 2/2012 | Pike ..................... | G06F 9/45558 718/1 |
| 2020/0280534 A1 * | 9/2020 | Rajendran ............. | H04L 61/103 |
| 2020/0412688 A1 * | 12/2020 | Cochran ............ | H04L 61/4552 |
| 2021/0194764 A1 * | 6/2021 | Badyan ................ | G06F 9/5077 |

* cited by examiner

*Primary Examiner* — Schquita D Goodwin
*Assistant Examiner* — Joseph M Cousins
(74) *Attorney, Agent, or Firm* — DALY, CROWLEY, MOFFORD & DURKEE, LLP (57) ABSTRACT

In one aspect, an example methodology implementing the disclosed techniques includes receiving, by a systems management console, a network address of a device in a virtual environment, and determining a network address associated with a virtual environment management console based on the received network address of the device in the virtual environment. The method also includes sending, by the systems management console via a systems management agent to the virtual environment management console using the determined network address associated with the virtual environment management console, a request for network addresses of virtual machine (VM) host servers and VMs in the virtual environment. The method also includes receiving, by the systems management console via the systems management agent from the virtual environment management console, the network addresses of the VM host servers and the VMs in the virtual environment and providing a notification of the discovered VM host servers and VMs.

20 Claims, 8 Drawing Sheets

```
#!/bin/bash

IFS=$'\n' for VM in $(vmware-cmd -1);
do
    VM_STATE=$(vmware-cmd "${VM}" getstate | awk -F" = " '{print $2}')
    if [ "${VM_STATE}" == "on" ]; then
        echo "Setting info for ${VM}"
        vmware-cmd "${VM}" setguestinfo hypervisor.hostname "$(hostname)"
        vmware-cmd "${VM}" setguestinfo hypervisor.build "$(vmware -v)"
    fi
done unset IFS
```

DEVICE DISCOVERY IN A VIRTUALIZED ENVIRONMENT

FIELD

The disclosure pertains generally to management of devices in virtual environments, and more particularly, to discovery of devices in a virtualized environment.

BACKGROUND

Data center administrators commonly utilize systems management consoles to monitor and manage devices (e.g., server, storage, and networking) in their IT environments. These consoles can be used to monitor and manage devices in physical, virtual, local, and remote environments. To enable monitoring and management of devices, each device must be discovered by (or added to) the systems management console. To this end, the consoles may provide a device discovery feature that enables discovery of the devices one device at a time. For modular devices such as a chassis, the consoles may provide a deep discovery feature which enables the discovery of the server, storage, and networking devices present in the chassis.

In virtualized environments, there may be multiple hosts, with each host running a large, and oftentimes very large, number of virtual devices (e.g., virtual machines (VMs)). The virtual devices may have different virtual hardware configurations, be running different operating systems, and be in different subnets. Presently, discovery of all devices present in a virtualized environment is a manual and cumbersome process, and typically requires providing the IP address of each device or IP address ranges of all devices. However, it is not uncommon for several VMs to be present on different subnets and/or VLANs, making those VMs unreachable using the systems management console. As a result, the systems management console and data center administrators may not be aware of all the devices that exist in the virtualized environment.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

Embodiments of the concepts, techniques, and structures disclosed herein include a systems management agent that enables a systems management console to discover all the reachable devices that are present in a virtual environment by receiving as an input a network address, such as an Internet Protocol (IP) address, of a single device in the virtual environment. In accordance with certain of the embodiments disclosed herein, the systems management agent is included in or otherwise incorporated into the systems management console and facilitates communication between the systems management console and a virtual environment management console. Thus, in some such embodiments, the systems management console may utilize the capabilities of the virtual environment management console in discovering the reachable devices present in the virtual environment.

In illustrative embodiments, the systems management console may provide a notification, such as a visual indication, of the devices discovered in the virtual environment that may be healthy and functional but are unreachable due to network configuration. For instance, such devices may be in a subnet or a VLAN that is unreachable from the systems management console. In some such illustrative embodiments, such devices that may be healthy and functional but are unreachable in the virtual environment may be designated or otherwise identified as semi-discovered devices on the systems management console. Providing such a notification allows system administrators to take appropriate action or actions for monitoring the semi-discovered devices. These and other advantages, configurations, modifications, and embodiments will be apparent in light of this disclosure.

In accordance with one example embodiment provided to illustrate the broader concepts, systems, and techniques described herein, a computer implemented method to discover reachable devices in a virtual environment includes providing a systems management console including a systems management agent configured to communicate with a virtual environment management console, the virtual environment management console configured to manage a virtual environment. The method also includes receiving, by the systems management console, a network address of a device in the virtual environment, and determining, by the systems management console, a network address associated with the virtual environment management console based on the received network address of the device in the virtual environment. The method further includes sending, by the systems management console via the systems management agent to the virtual environment management console using the determined network address associated with the virtual environment management console, a request for network addresses of virtual machine (VM) host servers and VMs in the virtual environment. The method also includes receiving, by the systems management console via the systems management agent from the virtual environment management console, the network addresses of the VM host servers and the VMs in the virtual environment, and providing, by the systems management console, a notification of the VM host servers and the VMs discovered in the virtual environment.

In some embodiments, the network address is an Internet Protocol (IP) address.

In some embodiments, receiving a network address of a device in the virtual environment comprises receiving a network address of a computing device that is hosting the virtual environment management console.

In some embodiments, receiving a network address of a device in the virtual environment comprises receiving a network address of a VM host server in the virtual environment, and determining a network address associated with the virtual environment management console comprises initiating an internal command using the network address of the VM host server.

In some embodiments, receiving a network address of a device in the virtual environment comprises receiving a network address of a VM in the virtual environment, and determining a network address associated with the virtual environment management console comprises receiving, from the VM, the network address associated with the virtual environment management console in response to sending to the VM a request for the network address associated with the virtual environment management console. In one aspect, the method also includes, in response to the request for the network address associated with the virtual environment management console, initiating, by the VM, a software program to determine the network address associated with the virtual environment management console.

In some embodiments, the method also includes, in response to the request for network addresses of VM host servers and VMs in the virtual environment, obtaining, by the virtual environment management console via an operating system passthrough channel from individual VM host servers, the network addresses of the VMs being hosted by the individual VM host server.

In some embodiments, providing a notification comprises a notification of at least one VM host server or VM discovered in the virtual environment that is unreachable from the systems management console.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to receive a network address of a device in a virtual environment and determine a network address associated with a virtual environment management console based on the received network address of the device in the virtual environment, the virtual environment management console configured to manage the virtual environment. Execution of the instructions also causes the one or more processors to send, via a systems management agent configured to communicate with a virtual environment management console, a request for network addresses of virtual machine (VM) host servers and VMs in the virtual environment. Execution of the instructions further causes the one or more processors to receive, via the systems management agent from the virtual environment management console, the network addresses of the VM host servers and the VMs in the virtual environment, and provide a notification of the VM host servers and the VMs discovered in the virtual environment.

In some embodiments, the network address is an Internet Protocol (IP) address.

In some embodiments, the received network address of a device in the virtual environment is a network address of a computing device that is hosting the virtual environment management console.

In some embodiments, the received network address of a device in the virtual environment is a network address of a VM host server in the virtual environment management console, and to determine a network address associated with a virtual environment management console comprises to initiate an internal command using the network address of the VM host server.

In some embodiments, the received network address of a device in the virtual environment is a network address of a VM in the virtual environment management console, and wherein the network address associated with the virtual environment management console is received from the VM in response to a request for the network address associated with the virtual environment management console sent to the VM. In one aspect, the VM determines the network address associated with the virtual environment management console via initiation of a software program.

In some embodiments, the virtual environment management console obtains from individual VM host servers, via an operating system passthrough channel, the network addresses of the VMs being hosted by the individual VM host server.

In some embodiments, the notification comprises a notification of at least one VM host server or VM discovered in the virtual environment that is unreachable from the systems management console.

According to another illustrative embodiment provided to illustrate the broader concepts described herein, a computer program product includes one or more non-transitory machine-readable mediums encoding instructions that when executed by one or more processors cause a process to be carried out for discovering reachable devices in a virtual environment. The process includes receiving a network address of a device in a virtual environment and determining a network address associated with a virtual environment management console based on the received network address of the device in the virtual environment, the virtual environment management console configured to manage the virtual environment. The process also includes sending, via a systems management agent configured to communicate with a virtual environment management console, a request for network addresses of virtual machine (VM) host servers and VMs in the virtual environment. The process further includes receiving, via the systems management agent from the virtual environment management console, the network addresses of the VM host servers and the VMs in the virtual environment, and providing a notification of the VM host servers and the VMs discovered in the virtual environment.

In some embodiments, the network address is an Internet Protocol (IP) address.

In some embodiments, receiving a network address of a device in the virtual environment comprises receiving a network address of a computing device that is hosting the virtual environment management console.

In some embodiments, receiving a network address of a device in the virtual environment comprises receiving a network address of a VM host server in the virtual environment, and determining a network address associated with the virtual environment management console comprises initiating an internal command using the network address of the VM host server.

In some embodiments, receiving a network address of a device in the virtual environment comprises receiving a network address of a VM in the virtual environment, and determining a network address associated with the virtual environment management console comprises receiving, from the VM, the network address associated with the virtual environment management console in response to sending to the VM a request for the network address associated with the virtual environment management console. In one aspect, the process also includes, in response to the request for the network address associated with the virtual environment management console, initiating, by the VM, a software program to determine the network address associated with the virtual environment management console.

In some embodiments, the process also includes, in response to the request for network addresses of VM host servers and VMs in the virtual environment, obtaining, by the virtual environment management console via an operating system passthrough channel from individual VM host servers, the network addresses of the VMs being hosted by the individual VM host server.

In some embodiments, providing a notification comprises a notification of at least one VM host server or VM discovered in the virtual environment that is unreachable from the systems management console.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

In the following description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

In the description of the implementations that follow, although certain specific embodiments use particular brands and names of products (e.g., Dell EMC products, Microsoft® and Amazon virtualization products and services, etc.), it will be appreciated in light of this disclosure that such embodiments and examples are not limited or restricted in application to the details of implementation in conjunction with the particular brands and names of products. Rather, the concepts, devices, systems, and techniques are capable of implementation in other examples and of being practiced or of being carried out in various ways. Further, examples of specific implementations are provided herein for illustrative purposes only and are not intended to be limiting. The acts components, elements, and features discussed in conjunction with any one or more examples are not intended to be excluded from a similar role in any other examples. By way of only one example, although certain concepts and techniques disclosed herein are described in the context of Dell EMC VMware® vCenter® Server, vCenter® console, Dell PowerEdge servers, Integrated Dell Remote Access Controller (iDRAC) Service Module (iSM), and/or SupportAssist, one of skill in the art will appreciate that the concepts and techniques disclosed herein are intended to be implemented and work within any customer ecosystem, not just the depicted Dell EMC ecosystems.

Figure 1:
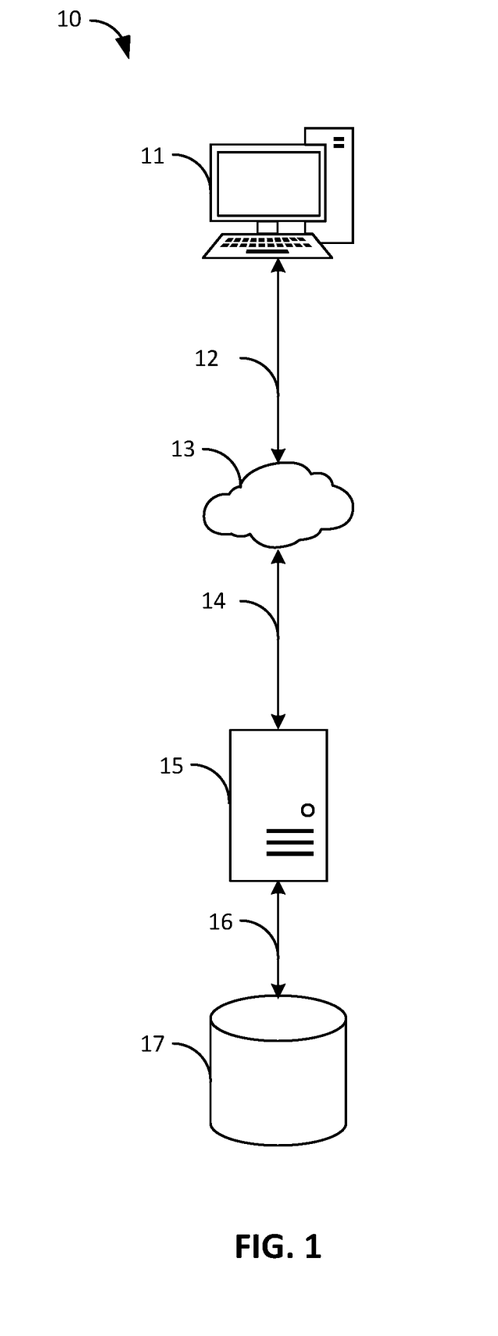
FIG. 1 schematically shows a client-server system in which the disclosed concepts, structures, and techniques may be advantageously embodied, in accordance with an embodiment of the present disclosure.

FIG. 1 schematically shows a client-server system 10 in which the disclosed concepts, structures, and techniques may be advantageously embodied, in accordance with an embodiment of the present disclosure. In accordance with client-server principles, the system 10 includes at least one client device coupled for bidirectional data communication with at least one server device using a data network. Generally, the client requests, via the data network, that the server perform a computation or other function, and the server responsively fulfills the request, optionally returning a result or status indicator to the client via the data network.

Thus, system 10 includes a client device 11. Client device 11 is illustrated as a desktop computer, but may be any electronic device known in the art, including without limitation a laptop computer, tablet computer, smartphone, embedded system, or any other device capable of transmitting and receiving data, and requesting that another electronic device perform a computation.

As shown in FIG. 1, client device 11 is coupled, via a data link 12, to a data network 13. Data link 12 is any combination of hardware or software suited for communicating data between client device 11 and other electronic devices via data network 13. Data link 12 may be, for example, a wired Ethernet link based on the Institute of Electrical and Electronics Engineers ("IEEE") 802.3 family of standards, a wireless radio link based on the IEEE 802.11 family of standards ("Wi-Fi"), or any other data connection.

Data network 13 is any combination of hardware or software suited for communicating data between electronic devices via data links. Data network 13 may be, for example, a local area network ("LAN"), a wide area network ("WAN"), a metropolitan area network ("MAN"), a virtual private network ("VPN"), the Internet, or any other type of data network.

It is appreciated that data network 13 operates to mediate data communication between multiple electronic devices. Thus, the depiction of only a single client device 11 in FIG. 1 is merely illustrative, and system 10 may have any number of client devices coupled for data communication using corresponding data links to data network 13. It is also appreciated that data network 13 may be operated by any number of autonomous entities, and thus may be a conglomeration of smaller networks that exchange data according to standardized protocols and data formats, including without limitation the Internet Protocol ("IP") specified by Internet Standard STD 5, the User Datagram Protocol ("UDP") specified by Internet Standard STD 6, and the Transmission Control Protocol ("TCP") specified by Internet Standard STD 7, among others.

Data network 13 allows client device 11 to communicate with a server device 15, which is coupled to data network 13 using a data link 14. Data link 14 is any combination of hardware or software suited for communicating data between server device 15 and other electronic devices via data network 13. Server device 15 may be any electronic device known in the art that is capable of transmitting and receiving data, and performing a computation on behalf of another electronic device.

Again, data network 13 operates to mediate data communication between multiple electronic devices. Thus, the depiction of only a single server device 15 in FIG. 1 is merely illustrative, and system 10 may have any number of server devices coupled for data communication using corresponding data links to data network 13. In particular, to provide simultaneous service to large numbers of client devices, a particular computation (or type of computation, such as rendering a web page) may be allocated to one of multiple server devices using a load balancer or other device. It is further appreciated that server device 15, along with additional server devices if required, may provide well-defined operations known as "services" according to a service-oriented architecture ("SOA"), as those terms are known in the art.

It is appreciated in accordance with client-server principles that the designation of device 11 as the "client device" and device 15 as the "server device" is arbitrary, as most electronic devices that are capable of transmitting and receiving data can perform computations on behalf of other electronic devices upon receipt of data, so requesting, according to a mutually agreed protocol. Thus, the designation of "client device" and "server device" is made herein with regard to an intended mode of operation of system 10, namely that client device 11 is the device requesting that a particular computation be performed on behalf of a user thereof, and that server device 15 operates a "service" to perform the computation and communicate the results to client device 11. A typical protocol for such interaction is the Hypertext Transfer Protocol ("HTTP" or "HTTP/1.1") specified as a proposed Internet Standard by Requests for Comment ("RFC") 7230 through 7235, which is used to implement the World Wide Web.

FIG. 1 shows server device 15 coupled, via a storage link 16, to a data storage device 17. Data storage device 17 may be a database, file system, volatile or non-volatile memory, network attached storage ("NAS"), storage area network ("SAN"), or any other hardware or software that is capable of storing data used by server device 15 or a service executing thereon. Storage link 16 may be any hardware or software capable of communicating data between server device 15 and data storage device 17. It is appreciated that, where more than one server device 15 is present, multiple server devices may communicate with the same data storage device 17 to provide data sharing between the server devices.

It is appreciated that a requested computation may be done in several parts, thereby requiring system 10 to retain an intermediate computational state between requests. If the services provided by server device 15 do not store any such state (for example, to simplify their design), then client device 11 may supply all state with each request. This type of communication may be provided using the representational state transfer ("REST") client-server architecture. In addition to being a stateless client-server architecture, REST systems permit responses to requests with identical inputs to be cached to improve response time; permit layering of services, thereby multiplying available functionality; permit services to require clients to perform some computation locally to improve performance; and provide a uniform interface for all client devices.

Figure 2:
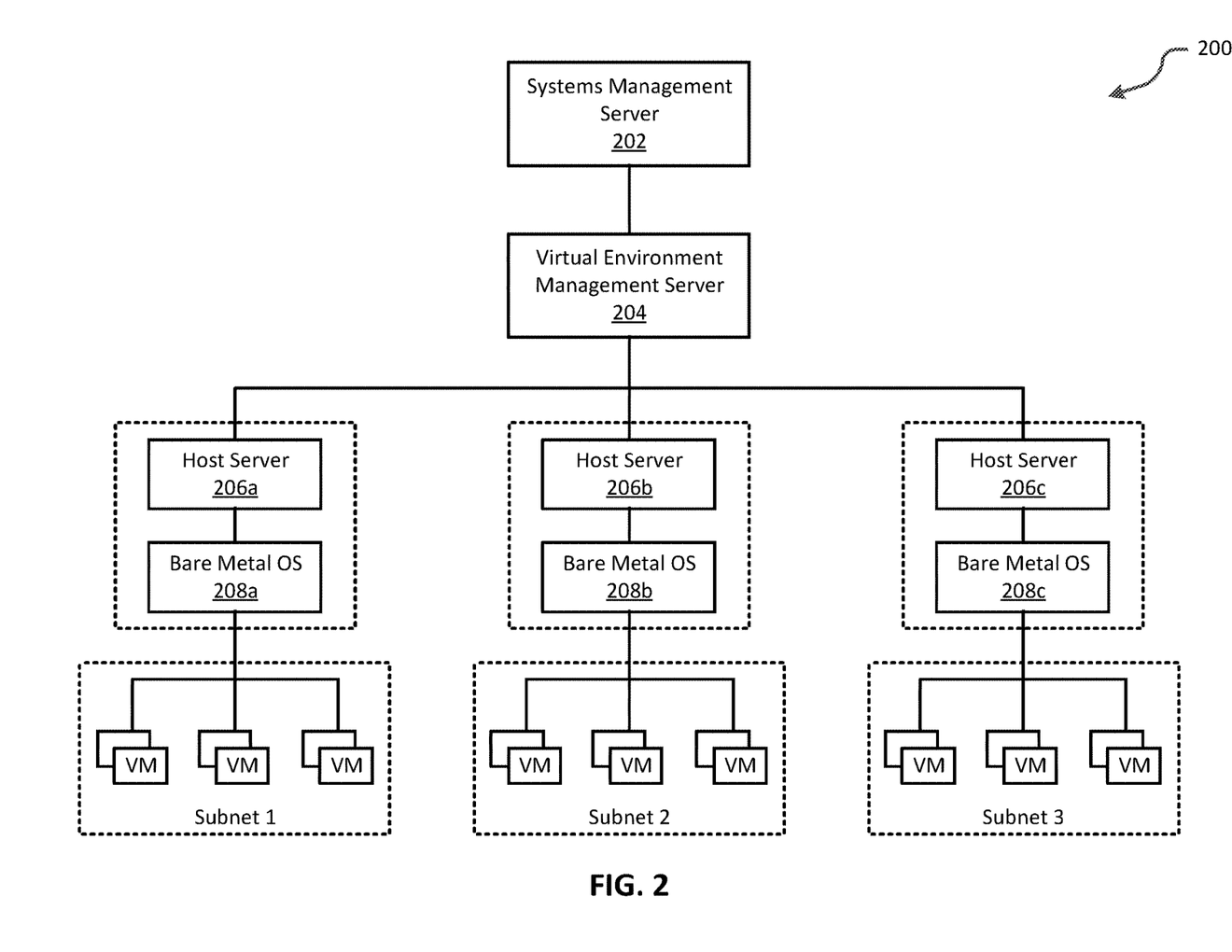
FIG. 2 is a block diagram of an illustrative virtual environment.

FIG. 2 is a block diagram of an illustrative virtual environment 200. As shown, virtual environment 200 includes a systems management server 202, a virtual environment management server 204, and host servers 206a, 206b, 206c (individually referred to herein as host server 206 or collectively referred to herein as host servers 206) each having a corresponding bare metal OS 208a, 208b, 208c (individually referred to herein as bare metal OS 208 or collectively referred to herein as bare metal OSes 208). The various components of virtual environment 200 may be communicably coupled to one another via a network (not shown). The network may correspond to one or more wired or wireless computer networks including, but not limited to, local area networks (LANs), wide area networks (WANs), personal area networks (PANs), metropolitan area networks (MANs), storage area networks (SANs), virtual private networks (VPNs), wireless local-area networks (WLAN), primary public networks, primary private networks, Wi-Fi (i.e., 802.11) networks, other types of networks, or some combination of the above. The number of host servers and corresponding bare metal OSes depicted in virtual environment 200 is for illustration, and those skilled in the art will appreciate that there may be a different number of host servers and corresponding bare metal OSes. For example, in certain implementations, virtual environment 200 may include tens, and in some cases hundreds of host servers and corresponding bare metal OSes.

In brief, servers 202, 204, 206 may be computing devices (e.g., physical computing machines) or other devices that offer information resources, services, and applications to users and other servers. Servers 202, 204, 206 are assigned at least one network address. Typically, the addresses are configured either manually (for example, by an administrator), automatically at startup by means of the Dynamic Host Configuration Protocol (DHCP), or by stateless address autoconfiguration methods. In Internet Protocol (IP) networks, IP addresses may be assigned using stateless address autoconfiguration.

Systems management server 202 is programmed or otherwise configured to (e.g., includes an application that is configured to) facilitate monitoring and management of the devices (e.g., server, storage, and networking devices, among others) in virtual environment 200. For instance, systems management server 202 may be configured to execute (or run) a systems management application which can be utilized by users, such as an IT administrator or datacenter administrator, for example, to discover devices and resources in virtual environment 200, monitor device and resource health and power consumption, inventory discovered devices and resources, and perform other functions related to the monitoring and management of devices and resources. In some implementations, the systems management application may collect telemetry data from discovered devices and provide the telemetry data for analysis.

Virtual environment management server 204 is programmed or otherwise configured to (e.g., includes an application that is configured to) facilitate monitoring and management of the virtual machine (VM) hosts (e.g., host servers 206) and the VMs within virtual environment 200. For instance, virtual environment management server 204 may be configured to execute (or run) a virtual environment management application which can be utilized to discover and manage processing resources (e.g., host servers 206), deploy hypervisors, create, configure, and/or maintain VMs on processing resources, identify and manage virtual equipment (e.g., virtual disks), and perform other functions related to management of the VMs and the servers hosting the VMs in virtual environment 200. Examples of virtual environment management server 204 include, but are not limited to, Dell PowerEdge server, Microsoft® System Center Virtual Machine server, Oracle VM server, and any server capable of executing another suitable virtual machine management software.

Host server 206 is programmed or otherwise configured to (e.g., includes virtualization software that is configured to) host one or more VMs. Host server 206 may include or be associated with a data store that stores production data and metadata of the VMs being hosted by host server 206. Examples of host server 206 include, but are not limited to, VMware® ESX Server, Microsoft® Virtual Server, Microsoft® Virtual Server Hyper-V host, Citrix XenServer, and any server capable of executing another suitable virtualization software.

Still referring to FIG. 2, individual host servers include a bare metal OS. For example, as can be seen in FIG. 2, host server 206a includes bare metal OS 208a, host server 206b includes bare metal OS 208b, and host server 206c includes bare metal OS 208c. The individual bare metal OSes 208 executes directly on the hardware of its corresponding host server 206. In other words, as a "bare metal" operating system, bare metal OS 208 interfaces directly (and not via an intervening operating system) with the hardware of host server 206. In other embodiments, one or more of the host servers may include virtualized operating systems. In virtual environment 200 of FIG. 2, the VMs hosted and managed by host server 206a belong to a first virtualized subnet (Subnet 1), the VMs hosted and managed by host server 206b belong to a second virtualized subnet (Subnet 2), and the VMs hosted and managed by host server 206c belong to a third virtualized subnet (Subnet 3).

Figure 3:
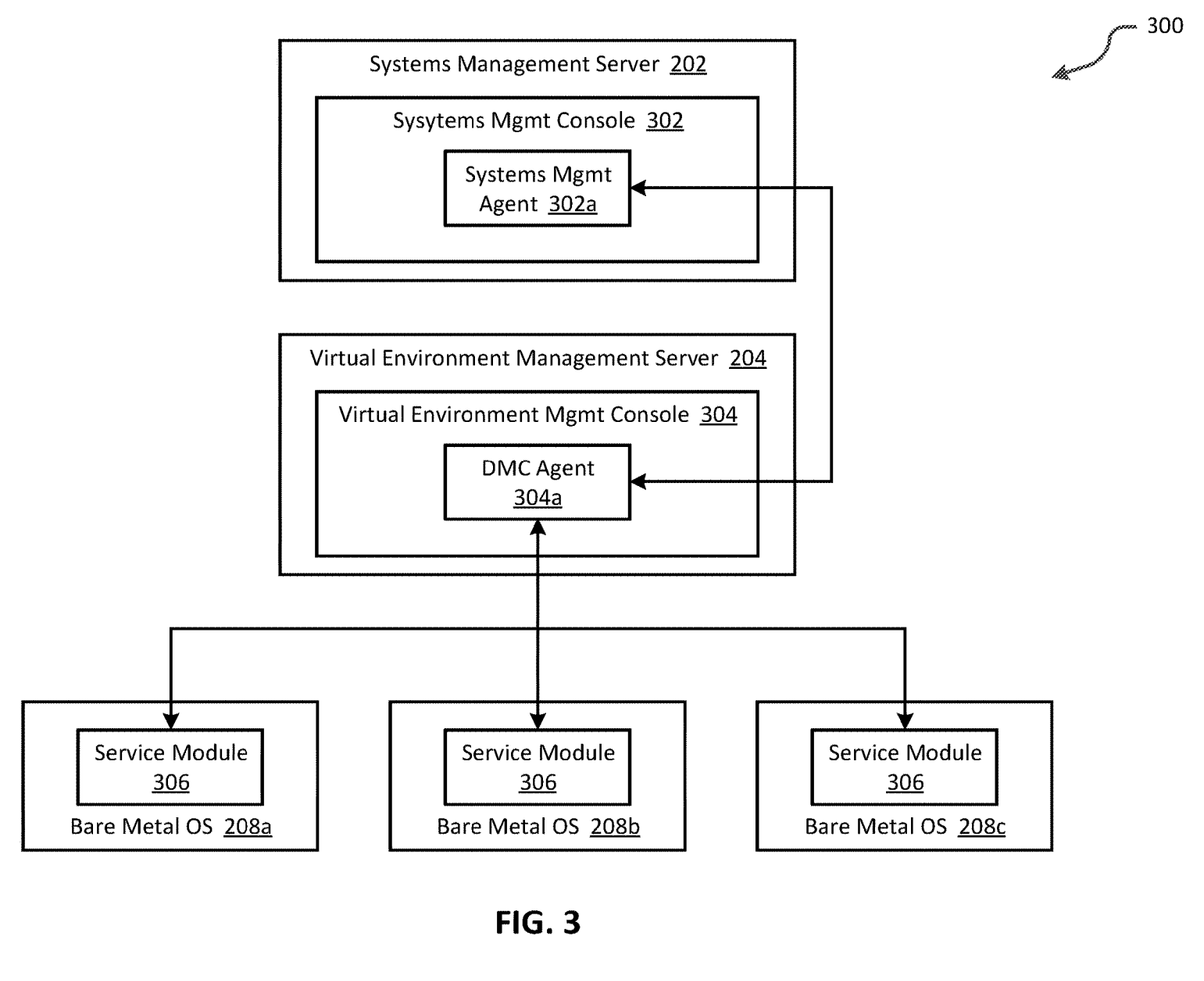
FIG. 3 is a block diagram of an illustrative virtual environment in which a systems management console can discover devices in the virtual environment, in accordance with an embodiment of the present disclosure.

FIG. 3 is a block diagram of an illustrative virtual environment 300 in which a systems management console can discover devices in virtual environment 300, in accordance with an embodiment of the present disclosure. Illustrative virtual environment 300 of FIG. 3 is similar to illustrative virtual environment 200 of FIG. 2, with additional details. Unless context dictates otherwise, those elements in FIG. 3 that are labelled identically (shown using like reference designators) to elements of FIG. 2 will not be described again for the purposes of clarity.

As shown in FIG. 3, systems management server 202 includes a systems management console 302. In some embodiments, systems management console 302 may be substantially similar to the systems management application described above with respect to FIG. 2. In such embodiments, systems management console 302 may include tools for discovering devices and resources in virtual environment 300, monitoring device and resource health and power consumption, inventorying devices and resources, and performing other functions related to the monitoring and management of devices and resources. By way of an example, systems management console 302 may be implemented using the Integrated Dell Remote Access Controller (iDRAC) Service Module (iSM).

In some embodiments, as can be seen in FIG. 3, systems management console 302 includes a systems management agent 302a. Systems management agent 302a is programmed or otherwise configured to enable or otherwise facilitate communication between systems management console 302 and virtual environment management server 204. Such communication may be via a communication channel. For instance, in an implementation, systems management agent 302a may be implemented as software code or a software component that enables systems management console 302 to perform a function it could not otherwise perform (e.g., a "plugin"). In other words, systems management agent 302a adds a specific feature(s) or functionality as variously described herein to systems management console 302.

With continued reference to FIG. 3, virtual environment management server 204 includes a virtual environment management console 304. In some embodiments, virtual environment management console 304 may be substantially similar to the virtual environment management application described above with respect to FIG. 2. In such embodiments, virtual environment management console 304 may include tools for discovering and managing processing resources, deploying hypervisors, creating, configuring, and/or maintaining VMs on processing resources, identifying and managing virtual equipment (e.g., virtual disks), and performing other functions related to management of the VMs and the servers hosting the VMs in virtual environment 300. Examples of virtual environment management console 304 include, but are not limited to Dell EMC VMware® vCenter®, Microsoft® System Center Virtual Machine Manager, Oracle VM Manager, and other suitable virtual machine manager software In some embodiments, as can be seen in FIG. 3, virtual environment management console 304 includes a device management console (DMC) agent 304a. DMC agent 304a is programmed or otherwise configured to enable or otherwise facilitate communication between virtual environment management console 304 and systems management console 302 of systems management server 202. In some such embodiments, DMC agent 304a facilitates such communication via systems management agent 302a of systems management console 302. For instance, in an implementation, DMC agent 304a may be implemented as software code or a software component that enables virtual environment management console 304 to perform a function it could not otherwise perform (e.g., a "plugin"). In other words, DMC agent 304a adds a specific feature(s) or functionality as variously described herein to virtual environment management console 304.

DMC agent 304a is programmed or otherwise configured to also enable or otherwise facilitate communication between virtual environment management console 304 and the individual bare metal OSes 208. In some embodiments, as can be seen in FIG. 3, DMC agent 304a facilitates such communication via a service module 306 included in the individual bare metal OSes 208. Service module 306 is programmed or otherwise configured to be installed on the individual host servers 206 and provide OS-level information (e.g., bare metal OS 208 level information) and other systems management data to virtual environment management console 304 of virtual environment management server 204. In an implementation, such OS-level information and systems management data may be provided via an internal operating system passthrough channel between DMC agent 304a of virtual environment management console 304 and service module 306. For example, service module 306 of bare metal OS 208a (i.e., bare metal OS 208a of host server 206a) can provide to DMC agent 304a of virtual environment management console 304, via the internal operating system passthrough channel, the network addresses (e.g., IP addresses) of the VMs that are configured and are being hosted by host server 206a. Similarly, service module 306 of bare metal OS 208b (i.e., bare metal OS 208b of host server 206b) can provide to DMC agent 304a of virtual environment management console 304, via the internal operating system passthrough channel, the network addresses (e.g., IP addresses) of the VMs that are configured and are being hosted by host server 206b. Likewise, service module 306 of bare metal OS 208c (i.e., bare metal OS 208c of host server 206c) can provide to DMC agent 304a of virtual environment management console 304, via the internal operating system passthrough channel, the network addresses (e.g., IP addresses) of the VMs that are configured and are being hosted by host server 206c. By way of an example, service module 306 may be implemented using Dell EMC SupportAssist/Integrated Dell Remote Access Controller (iDRAC) Service Module (iSM) or Dell Open Manage Enterprise (OME).

Figure 4:
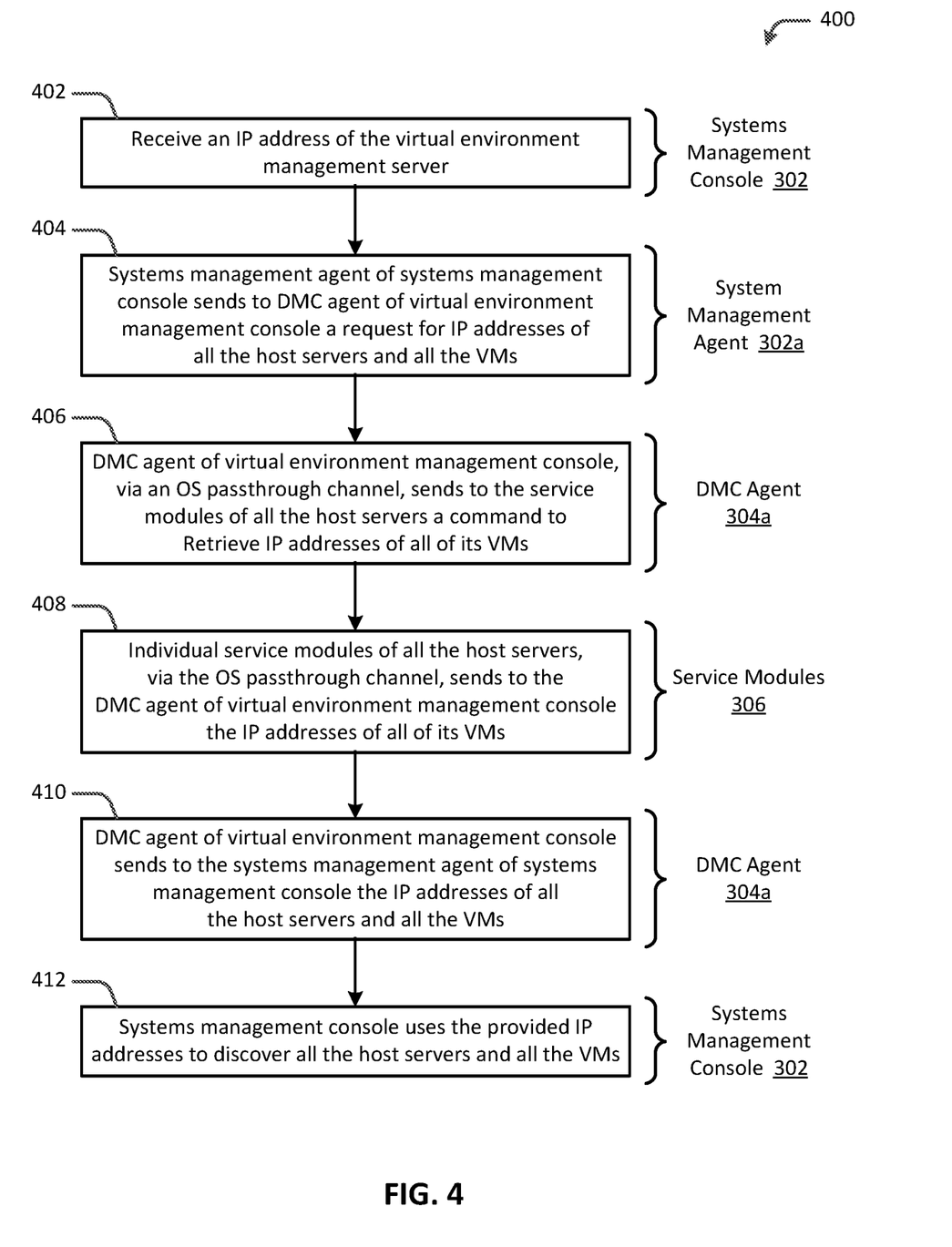
FIG. 4 is a flow diagram of an example process for using an IP address of a virtual environment server to discover devices in a virtualized environment, in accordance with an embodiment of the present disclosure.

FIG. 4 is a flow diagram of an example process 400 for using an IP address of a virtual environment server to discover devices in a virtualized environment, in accordance with an embodiment of the present disclosure. Process 400, and illustrative processes 500 and 600 further described below, may be implemented or performed by any suitable hardware, or combination of hardware and software, including without limitation the system shown and described with respect to FIG. 1, the components shown and described with respect to FIG. 3, the computer system shown and described with respect to FIG. 7, or a combination thereof. For example, in some embodiments, the operations, functions, or actions illustrated in process 400, and illustrative processes 500 and 600 further described below, may be performed, for example, in whole or in part by any combination of components of a computer system 70 described with respect to FIG. 7 below and/or systems management console 302, systems management agent, 302a, DCM agent 304a, service modules 306, the VMs, or any combination of these including other components of virtual environment 300 described with respect to FIG. 3.

With reference to process 400 of FIG. 4, and in an illustrative scenario, an administrator (e.g., an administrator of a data center) may want to discover all the devices in a virtualized environment. These devices include both reachable devices (i.e., devices in the virtualized environment that can be reached from systems management console 302) and unreachable devices (i.e., devices that are healthy and functional in the virtualized environment but are not reachable from systems management console 302). These discovered unreachable devices may be indicated as being "semi-discovered" devices in the virtualized environment. Discovery of the semi-discovered devices allows the administrator to take necessary actions (e.g., check to determine whether the semi-discovered devices are in a whitelist, check to determine whether the network configuration needs to be changed, among other actions) for monitoring the semi-discovered devices. To discover all the devices in the virtualized environment, the administrator may input to systems management console 302 an IP address of virtual environment management server 204.

At 402, systems management console 302 receives the input IP address of virtual environment management server 204. The IP address of virtual environment management server 204 allows systems management console 302 to ascertain or otherwise determine a network address (i.e., the IP address) associated with virtual environment management console 304 since virtual environment management console 304 is hosted on virtual environment management server 204. Note that virtual environment management console 304 has or otherwise is knowledgeable of the IP addresses of host servers 206 in the virtualized environment, and can ascertain or otherwise determine the IP addresses of all the VMs being hosted by host servers 206, by virtue of its function and role (e.g., management of the VMs and the servers hosting the VMs) in the virtualized environment.

Upon determining the location of virtual environment management console 304, at 404, systems management agent 302a of systems management console 302 may send to DMC agent 304a of virtual environment management console 304 a request for the IP addresses of all the host servers 206 and all the VMs in the virtualized environment. In response to receiving the request, at 406, DMC agent 304a may ascertain or otherwise determine from virtual environment management console 304 the IP addresses of host servers 206 that are being managed by virtual environment management console 304. Upon determining the IP addresses of host servers 206, DMC agent 304a may send to service module 306 of the individual host servers 206 (i.e., service module 306 of bare metal 208 of the individual host servers 206) a command to retrieve the IP addresses of all VMs that are being hosted by the individual host servers 206. DMC agent 304a may send the command via the operating system passthrough channel to the individual service modules 306. At 408, in response to the command from DMC agent 304a, the individual service modules 306 sends or otherwise returns the IP addresses of its VMs (i.e., the IP addresses of the VMs being hosted by the particular host server 206 on which service module 306 is executing).

By way of an example, in the case of a Dell EMC VMware® vCenter® implementation, DMC agent 304a of virtual environment management console 304 may initiate a Get-VMHost command (e.g., PowerCLI command) with the IP address and/or hostname of virtual environment management console 304 (e.g., vCenter IP/hostname) as a parameter to retrieve the IP addresses of the individual host servers 206. DMC agent 304a may then utilize the retrieved IP addresses of the individual host servers 206 to initiate a Get-VM command (e.g., PowerCLI command) to retrieve the IP addresses of all the VMs that are being hosted by the individual host servers 206.

Upon retrieving the IP addresses of all the VMs in the virtualized environment, at 410, DMC agent 304a of virtual environment management console 304 may send or otherwise provide to systems management agent 302a of systems management console 302 the IP addresses of the host servers 206 and the IP addresses of the VMs that are being hosted by the individual host servers 206. At 412, systems management console 302 may use the provided IP addresses (i.e., the IP addresses provided by DMC agent 304a of virtual environment management console 304) to discover host servers 206 and all the VMs in the virtualized environment. The host servers 206 and the VMs discovered using the provided IP addresses are the host servers and the VMs that are healthy and functional in the virtualized environment.

In some embodiments, additional operations are performed. For example, in one embodiment, upon discovering all the host servers 206 and all the VMs using the provided IP addresses, systems management console 302 may identify or otherwise determine which of the discovered host servers 206 and VMs are unreachable devices in the virtualized environment. For instance, the unreachable devices may be determined by matching against the device which were discovered by systems management console 302 without utilizing the IP addresses retrieved by systems management agent 302a (i.e., the IP addresses provided by DMC agent 304a of virtual environment management console 304). Upon determining the unreachable devices, systems management console 302 may display on a display or screen a listing of the unreachable devices. In the display, the unreachable devices may be indicated as being semi-discovered devices in the virtualized environment.

Figure 5:
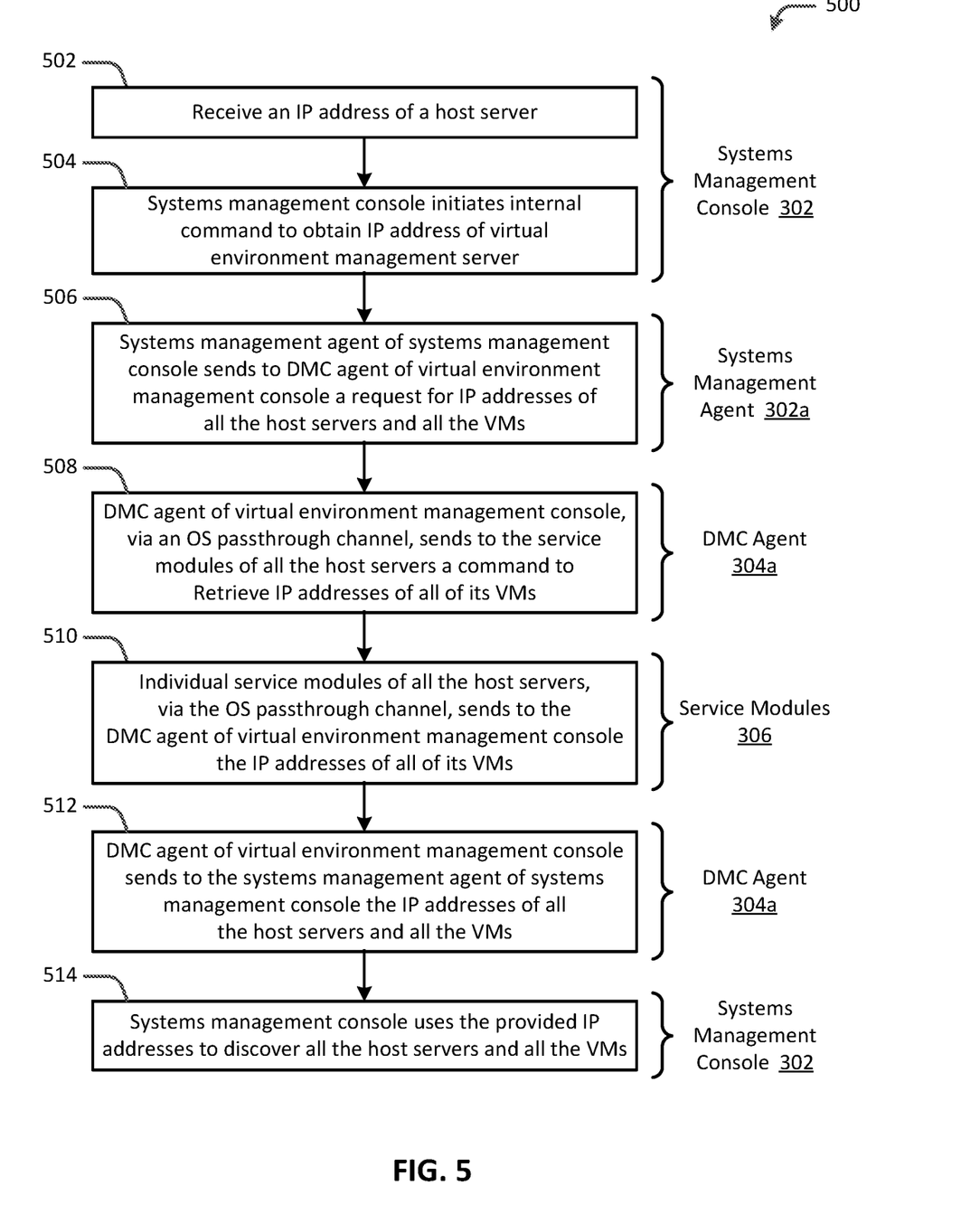
FIG. 5 is a flow diagram of an example process for using an IP address of a host server to discover devices in a virtualized environment, in accordance with an embodiment of the present disclosure.

FIG. 5 is a flow diagram of an example process 500 for using an IP address of a host server to discover devices in a virtualized environment, in accordance with an embodiment of the present disclosure. Like the example described above with respect to FIG. 4, in an illustrative scenario, an administrator (e.g., an administrator of a data center) may want to discover all the devices in a virtualized environment. To discover all the devices in the virtualized environment, the administrator may input to systems management console 302 an IP address of a host server (e.g., host server 206) in the virtualized environment.

At 502, systems management console 302 receives the input IP address of the host server in the virtualized environment. At 504, systems management console 302 may, utilizing the provided IP address of the host server, initiate an internal management command to ascertain or otherwise determine the IP address of or otherwise associated with virtual environment management server 204 that is hosting virtual environment management console 304 (i.e., address of the server that is being used to manage the virtualized environment).

By way of an example, in the case of a Dell EMC VMware® vCenter® implementation, systems management console 302 may initiate a grep command (e.g., ESXCLI command such as "[root@P2-H-S12-C18-N1:~] grep serverIp/etc/vmware/vpxa/vpxa.cfg") to retrieve the IP address of the server (e.g., "<serverIp>100.97.20.173<serverIP>") that is being used to manage the virtualized environment (e.g., virtual environment management server 204). In the above example, "grep" is a command which is used to filter the requested value/data from a file or output result. In this example case, "/etc/vmware/vpxa/vpxa.cfg" is the name of the file that contains the server IP address (e.g., the VMware® vCenter® console server IP address) and other data and configuration details related to the server. Initiating the "grep" command with the "serverIp" parameter ("grep serverIp") returns the value of the serverIp attribute, which in this example is "100.97.20.173"—the IP address of the server that is being used to manage the virtualized environment.

Upon determining the IP address of virtual environment management server 204, at 506, systems management agent 302a of systems management console 302 may send to DMC agent 304a of virtual environment management console 304 a request for the IP addresses of all the host servers 206 and all the VMs in the virtualized environment. The operations of blocks 508-514 of process 500 are substantially similar to the operations of blocks 406-412, respectively, of process 400 previously described with respect to FIG. 4, and that relevant discussion is equally applicable here and will not be described again for the purposes of clarity.

Figure 6:
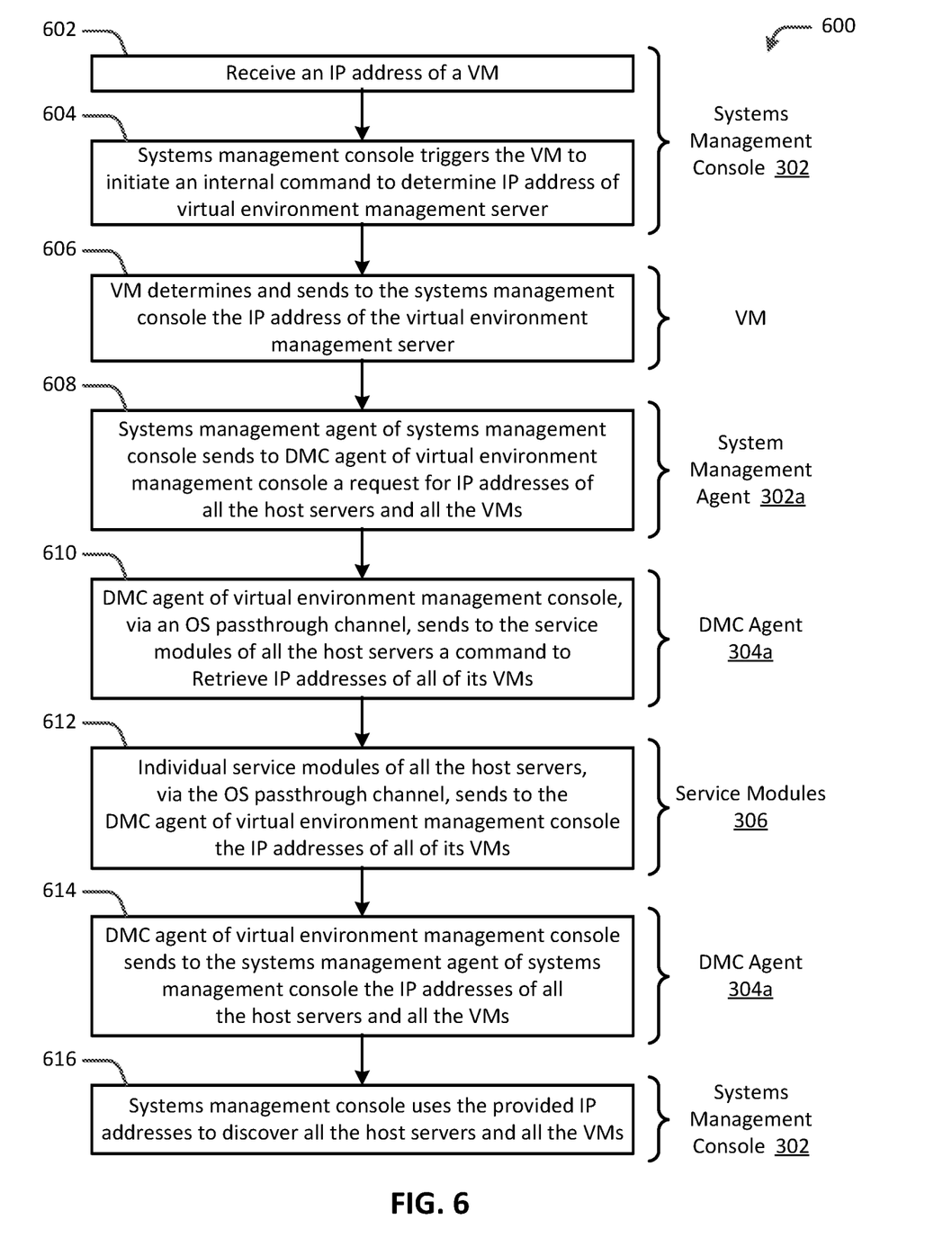
FIG. 6 is a flow diagram of an example process for using an IP address of a virtual machine (VM) to discover devices in a virtualized environment, in accordance with an embodiment of the present disclosure.

FIG. 6 is a flow diagram of an example process 600 for using an IP address of a virtual machine (VM) to discover devices in a virtualized environment, in accordance with an embodiment of the present disclosure. Like the examples described above with respect to FIGS. 4 and 5, in an illustrative scenario, an administrator (e.g., an administrator of a data center) may want to discover all the devices in a virtualized environment. To discover all the devices in the virtualized environment, the administrator may input to systems management console 302 an IP address of a VM in the virtualized environment.

At 602, systems management console 302 receives the input IP address of the VM in the virtualized environment. Using the IP address of the VM, at 604, systems management console 302 may trigger or otherwise signal the VM (i.e., the VM associated with the input IP address) to initiate an internal command to ascertain or otherwise determine the IP address of or otherwise associated with virtual environment management server 204 that is hosting virtual environment management console 304 (i.e., address of the server that is being used to manage the virtualized environment).

Figure 7:
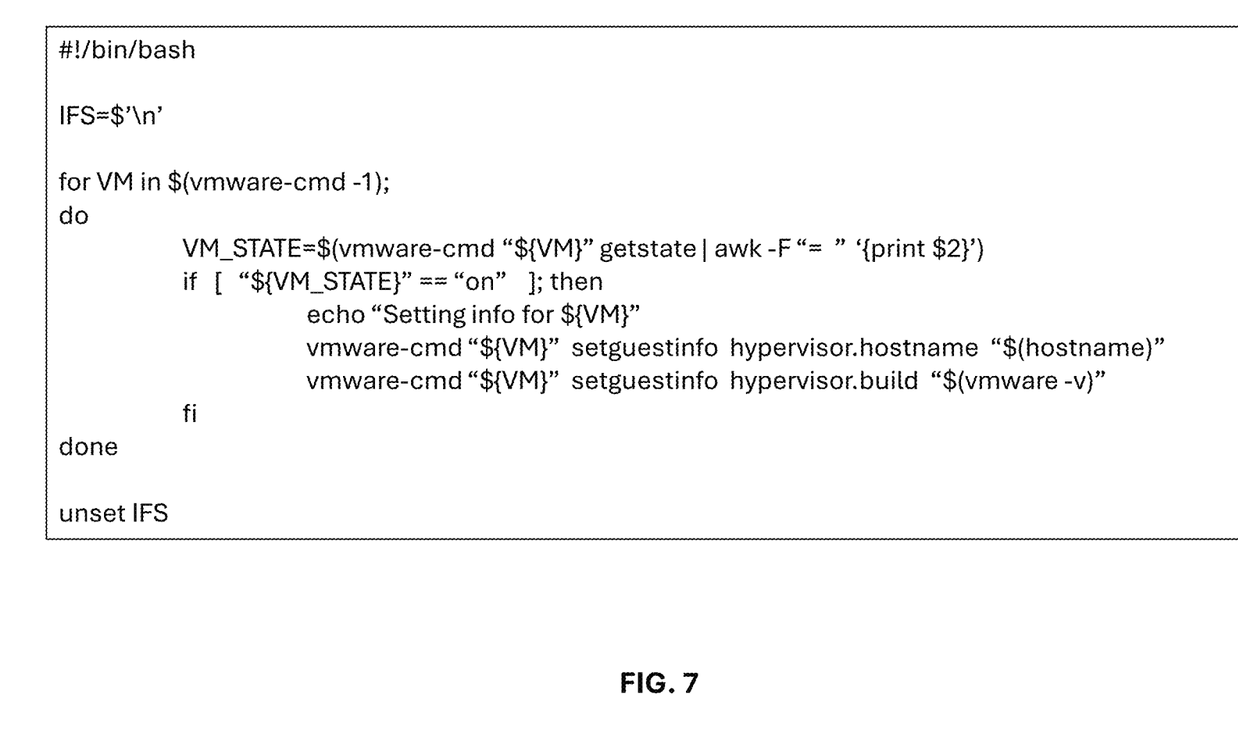
FIG. 7 shows an example script to discover an IP address of virtual environment server, in accordance with an embodiment of the present disclosure.

In response, at 606, the VM may initiate a script (internal command) to determine the otherwise determine the IP address of or otherwise associated with virtual environment management server 204. By way of an example, in the case of a Dell EMC VMware® vCenter® implementation, the VM may initiate the illustrative script shown in FIG. 7 to determine the IP address of virtual environment management server 204. Note however that the script shown in FIG. 7 is but one example and that other commands and/or scripts may be developed and used to determine the IP address of virtual environment management server 204 as will be apparent to one of skill in the art in light of this disclosure. Upon determining the IP address of virtual environment management server 204, the VM may send or otherwise provide to systems management console 302 the IP address of virtual environment management server 204.

Upon receiving the IP address of virtual environment management server 204, at 608, systems management agent 302a of systems management console 302 may send to DMC agent 304a of virtual environment management console 304 a request for the IP addresses of all the host servers 206 and all the VMs in the virtualized environment. The operations of blocks 610-616 of process 600 are substantially similar to the operations of blocks 406-412, respectively, of process 400 previously described with respect to FIG. 4, and that relevant discussion is equally applicable here and will not be described again for the purposes of clarity.

Figure 8:
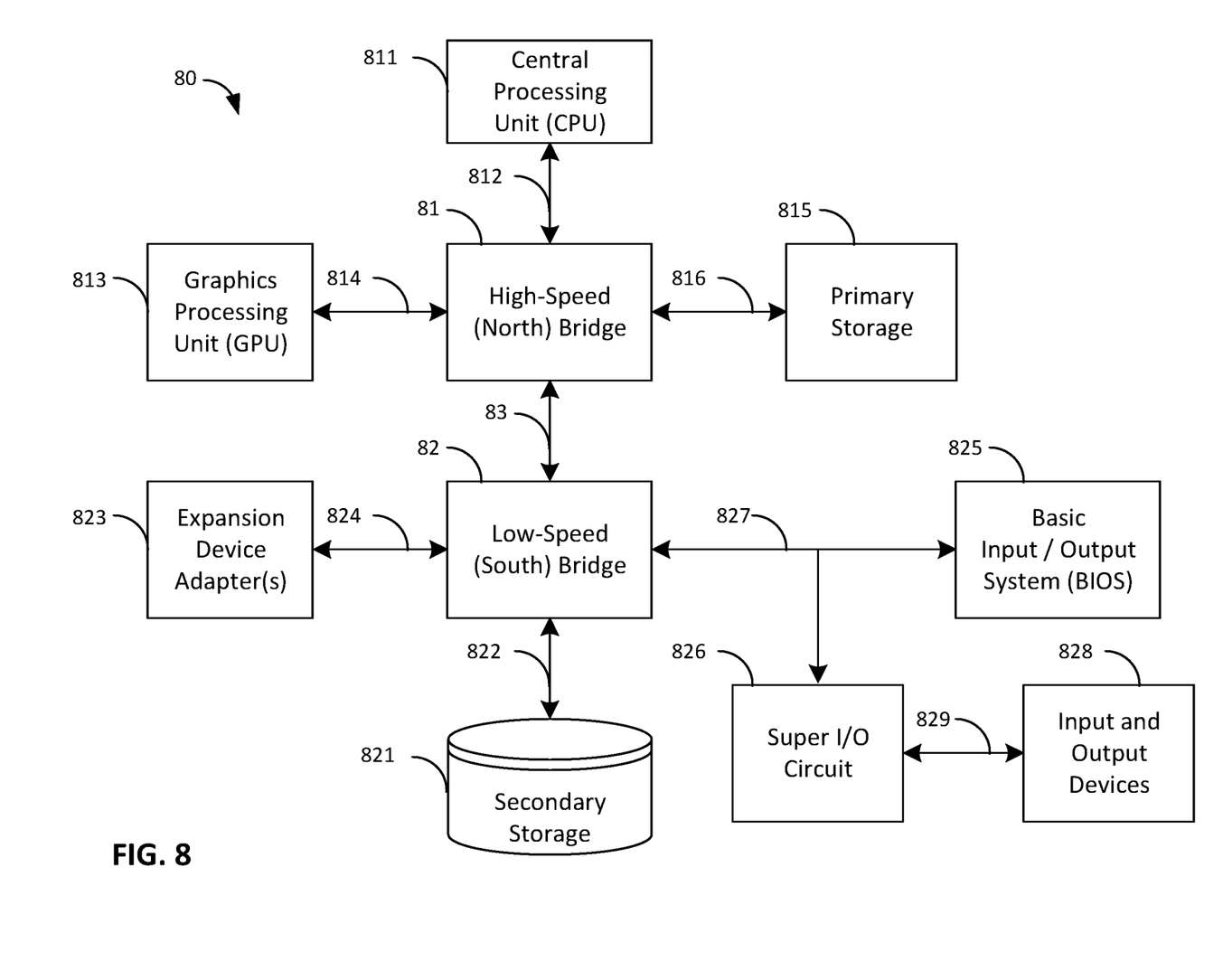
FIG. 8 schematically shows relevant physical components of a computer system that may be used in accordance with an embodiment of the concepts, structures, and techniques disclosed herein.

FIG. 8 schematically shows relevant physical components of a computer system 80 that may be used in accordance with an embodiment of the concepts, structures, and techniques disclosed herein. Generally, computer system 80 has many functional components that communicate data with each other using data buses. The functional components of FIG. 8 are physically arranged based on the speed at which each must operate, and the technology used to communicate data using buses at the necessary speeds to permit such operation.

Thus, computer system 80 is arranged as high-speed components and buses 811 to 816 and low-speed components and buses 821 to 829. High-speed components and buses 811 to 816 are coupled for data communication using a high-speed bridge 81, also called a "northbridge," while low-speed components and buses 821 to 829 are coupled using a low-speed bridge 82, also called a "southbridge."

Computer system 80 includes a central processing unit ("CPU") 811 coupled to high-speed bridge 81 via a bus 812. CPU 811 is electronic circuitry that carries out the instructions of a computer program. As is known in the art, CPU 811 may be implemented as a microprocessor; that is, as an integrated circuit ("IC"; also called a "chip" or "microchip"). In some embodiments, CPU 811 may be implemented as a microcontroller for embedded applications, or according to other embodiments known in the art.

Bus 812 may be implemented using any technology known in the art for interconnection of CPUs (or more particularly, of microprocessors). For example, bus 812 may be implemented using the HyperTransport architecture developed initially by AMD, the Intel QuickPath Interconnect ("QPI"), or a similar technology. In some embodiments, the functions of high-speed bridge 81 may be implemented in whole or in part by CPU 811, obviating the need for bus 812.

Computer system 80 includes one or more graphics processing units (GPUs) 813 coupled to high-speed bridge 81 via a graphics bus 814. Each GPU 813 is designed to process commands from CPU 811 into image data for display on a display screen (not shown). In some embodiments, CPU 811 performs graphics processing directly, obviating the need for a separate GPU 813 and graphics bus 814. In other embodiments, GPU 813 is physically embodied as an integrated circuit separate from CPU 811 and may be physically detachable from computer system 80 if embodied on an expansion card, such as a video card. GPU 813 may store image data (or other data, if GPU 813 is used as an auxiliary computing processor) in a graphics buffer.

Graphics bus 814 may be implemented using any technology known in the art for data communication between a CPU and a GPU. For example, graphics bus 814 may be implemented using the Peripheral Component Interconnect Express ("PCI Express" or "PCIe") standard, or a similar technology.

Computer system 80 includes a primary storage 815 coupled to high-speed bridge 81 via a memory bus 816. Primary storage 815, which may be called "main memory" or simply "memory" herein, includes computer program instructions, data, or both, for use by CPU 811. Primary storage 815 may include random-access memory ("RAM"). RAM is "volatile" if its data are lost when power is removed, and "non-volatile" if its data are retained without applied power. Typically, volatile RAM is used when computer system 80 is "awake" and executing a program, and when computer system 80 is temporarily "asleep", while non-volatile RAM ("NVRAM") is used when computer system 80 is "hibernating"; however, embodiments may vary. Volatile RAM may be, for example, dynamic ("DRAM"), synchronous ("SDRAM"), and double-data rate ("DDR SDRAM"). Non-volatile RAM may be, for example, solid-state flash memory. RAM may be physically provided as one or more dual in-line memory modules ("DIMMs"), or other, similar technology known in the art.

Memory bus 816 may be implemented using any technology known in the art for data communication between a CPU and a primary storage. Memory bus 816 may comprise an address bus for electrically indicating a storage address, and a data bus for transmitting program instructions and data to, and receiving them from, primary storage 815. For example, if data are stored and retrieved 64 bits (eight bytes) at a time, then the data bus has a width of 64 bits. Continuing this example, if the address bus has a width of 32 bits, then $2^{32}$ memory addresses are accessible, so computer system 80 may use up to $8*2^{32}=32$ gigabytes (GB) of primary storage 815. In this example, memory bus 816 will have a total width of 64+32=96 bits. Computer system 80 also may include a memory controller circuit (not shown) that converts electrical signals received from memory bus 816 to electrical signals expected by physical pins in primary storage 815, and vice versa.

Computer memory may be hierarchically organized based on a tradeoff between memory response time and memory size, so depictions and references herein to types of memory as being in certain physical locations are for illustration only. Thus, some embodiments (e.g. embedded systems) provide CPU 811, graphics processing units 813, primary storage 815, and high-speed bridge 81, or any combination thereof, as a single integrated circuit. In such embodiments, buses 812, 814, 816 may form part of the same integrated circuit and need not be physically separate. Other designs for computer system 80 may embody the functions of CPU 811, graphics processing units 813, and primary storage 815 in different configurations, obviating the need for one or more of buses 812, 814, 816.

The depiction of high-speed bridge 81 coupled to CPU 811, GPU 813, and primary storage 815 is merely exemplary, as other components may be coupled for communication with high-speed bridge 81. For example, a network interface controller ("NIC" or "network adapter") may be coupled to high-speed bridge 81, for transmitting and receiving data using a data channel. The NIC may store data to be transmitted to, and received from, the data channel in a network data buffer.

High-speed bridge 81 is coupled for data communication with low-speed bridge 82 using an internal data bus 83. Control circuitry (not shown) may be required for transmitting and receiving data at different speeds. Internal data bus 83 may be implemented using the Intel Direct Media Interface ("DMI") or a similar technology.

Computer system 80 includes a secondary storage 821 coupled to low-speed bridge 82 via a storage bus 822. Secondary storage 821, which may be called "auxiliary memory", "auxiliary storage", or "external memory" herein, stores program instructions and data for access at relatively low speeds and over relatively long durations. Since such durations may include removal of power from computer system 80, secondary storage 821 may include non-volatile memory (which may or may not be randomly accessible).

Non-volatile memory may comprise solid-state memory having no moving parts, for example a flash drive or solid-state drive. Alternately, non-volatile memory may comprise a moving disc or tape for storing data and an apparatus for reading (and possibly writing) the data. Data may be stored (and possibly rewritten) optically, for example on a compact disc ("CD"), digital video disc ("DVD"), or Blu-ray disc ("BD"), or magnetically, for example on a disc in a hard disk drive ("HDD") or a floppy disk, or on a digital audio tape ("DAT"). Non-volatile memory may be, for example, read-only ("ROM"), write-once read-many ("WORM"), programmable ("PROM"), erasable ("EPROM"), or electrically erasable ("EEPROM").

Storage bus 822 may be implemented using any technology known in the art for data communication between a CPU and a secondary storage and may include a host adaptor (not shown) for adapting electrical signals from low-speed bridge 82 to a format expected by physical pins on secondary storage 821, and vice versa. For example, storage bus 822 may use a Universal Serial Bus ("USB") standard; a Serial AT Attachment ("SATA") standard; a Parallel AT Attachment ("PATA") standard such as Integrated Drive Electronics ("IDE"), Enhanced IDE ("EIDE"), ATA Packet Interface ("ATAPI"), or Ultra ATA; a Small Computer System Interface ("SCSI") standard; or a similar technology.

Computer system 80 also includes one or more expansion device adapters 823 coupled to low-speed bridge 82 via a respective one or more expansion buses 824. Each expansion device adapter 823 permits computer system 80 to communicate with expansion devices (not shown) that provide additional functionality. Such additional functionality may be provided on a separate, removable expansion card, for example an additional graphics card, network card, host adaptor, or specialized processing card.

Each expansion bus 824 may be implemented using any technology known in the art for data communication between a CPU and an expansion device adapter. For example, expansion bus 824 may transmit and receive electrical signals using a Peripheral Component Interconnect ("PCI") standard, a data networking standard such as an Ethernet standard, or a similar technology.

Computer system 80 includes a basic input/output system ("BIOS") 825 and a Super I/O circuit 826 coupled to low-speed bridge 82 via a bus 827. BIOS 825 is a nonvolatile memory used to initialize the hardware of computer system 80 during the power-on process. Super I/O circuit 826 is an integrated circuit that combines input and output ("I/O") interfaces for low-speed input and output devices 828, such as a serial mouse and a keyboard. In some embodiments, BIOS functionality is incorporated in Super I/O circuit 826 directly, obviating the need for a separate BIOS 825.

Bus 827 may be implemented using any technology known in the art for data communication between a CPU, a BIOS (if present), and a Super I/O circuit. For example, bus 827 may be implemented using a Low Pin Count ("LPC") bus, an Industry Standard Architecture ("ISA") bus, or similar technology. Super I/O circuit 826 is coupled to I/O devices 828 via one or more buses 829. Buses 829 may be serial buses, parallel buses, other buses known in the art, or a combination of these, depending on the type of I/O devices 828 coupled to computer system 80.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A computer implemented method to discover reachable devices in a virtual environment, the method comprising:
    providing a systems management console including a systems management agent configured to communicate with a virtual environment management console, the virtual environment management console hosted on a virtual management server and configured to manage a virtual environment;
    receiving, by the systems management console, a network address of a device in the virtual environment;
    determining, by the systems management console, a network address associated with the virtual environment management server from the received network address of the device in the virtual environment;
    sending, by the systems management console via the systems management agent to the virtual environment management console using the determined network address associated with the virtual environment management server, a request for network addresses of virtual machine (VM) host servers and VMs in the virtual environment;
    receiving, by the systems management console via the systems management agent from the virtual environment management console, the network addresses of the VM host servers and the VMs in the virtual environment; and providing, by the systems management console, a notification of the VM host servers and the VMs discovered in the virtual environment.

2. The method of claim 1, wherein the network address is an Internet Protocol (IP) address.

3. The method of claim 1, wherein receiving the network address of the device in the virtual environment comprises receiving a network address of a computing device that is hosting the virtual environment management console.

4. The method of claim 1, wherein receiving the network address of the device in the virtual environment comprises receiving a network address of a VM host server in the virtual environment, and wherein determining the network address associated with the virtual environment management server comprises initiating an internal command using the network address of the VM host server.

5. The method of claim 1, wherein receiving the network address of the device in the virtual environment comprises receiving a network address of a VM in the virtual environment, and wherein determining the network address associated with the virtual environment management server comprises receiving, from the VM, the network address associated with the virtual environment management server in response to sending to the VM a request for the network address associated with the virtual environment management console.

6. The method of claim 5, further comprising, in response to the request for the network address associated with the virtual environment management server, initiating, by the VM, a software program to determine the network address associated with the virtual environment management server.

7. The method of claim 1, further comprising, in response to the request for network addresses of VM host servers and VMs in the virtual environment, obtaining, by the virtual environment management console via an operating system passthrough channel from individual VM host servers, the network addresses of the VMs being hosted by the individual VM host server.

8. The method of claim 1, wherein providing a notification comprises a notification of at least one VM host server or VM discovered in the virtual environment that is unreachable from the systems management console.

9. A system comprising:
one or more non-transitory machine-readable mediums configured to store instructions; and
one or more processors configured to execute the instructions stored on the one or more non-transitory machine-readable mediums, wherein execution of the instructions causes the one or more processors to,
receive a network address of a device in a virtual environment;
determine a network address associated with a virtual environment management server from the received network address of the device in the virtual environment, the virtual environment management server hosting a virtual environment management console configured to manage the virtual environment;
send, via a systems management agent configured to communicate with a virtual environment management console, a request for network addresses of virtual machine (VM) host servers and VMs in the virtual environment;
receive, via the systems management agent from the virtual environment management console, the network addresses of the VM host servers and the VMs in the virtual environment; and provide a notification of the VM host servers and the VMs discovered in the virtual environment.

10. The system of claim 9, wherein the network address is an Internet Protocol (IP) address.

11. The system of claim 9, wherein the received network address of the device in the virtual environment is a network address of a computing device that is hosting the virtual environment management console.

12. The system of claim 9, wherein the received network address of the device in the virtual environment is a network address of a VM host server in the virtual environment management console, and wherein the network address associated with the virtual environment management server is determined via initiation of an internal command using the network address of the VM host server.

13. The system of claim 9, wherein the received network address of the device in the virtual environment is a network address of a VM in the virtual environment management console, and wherein the network address associated with the virtual environment management server is received from the VM in response to a request for the network address associated with the virtual environment management console sent to the VM.

14. The system of claim 13, wherein the VM determines the network address associated with the virtual environment management server via initiation of a software program.

15. The system of claim 9, wherein the virtual environment management console obtains from individual VM host servers, via an operating system passthrough channel, the network addresses of the VMs being hosted by the individual VM host server.

16. The system of claim 9, wherein the notification comprises a notification of at least one VM host server or VM discovered in the virtual environment that is unreachable from the systems management console.

17. A computer program product including one or more non-transitory machine-readable mediums encoding instructions that when executed by one or more processors cause a process to be carried out for discovering reachable devices in a virtual environment, the process comprising:
receiving a network address of a device in a virtual environment;
determining a network address associated with a virtual environment management server from the received network address of the device in the virtual environment, the virtual environment management server hosting a virtual environment management console configured to manage the virtual environment;
sending, via a systems management agent configured to communicate with a virtual environment management console, a request for network addresses of virtual machine (VM) host servers and VMs in the virtual environment;
receiving, via the systems management agent from the virtual environment management console, the network addresses of the VM host servers and the VMs in the virtual environment; and
providing a notification of the VM host servers and the VMs discovered in the virtual environment.

18. The computer program product of claim 17, wherein receiving the network address of the device in the virtual environment comprises receiving a network address of a computing device that is hosting the virtual environment management console.

19. The computer program product of claim 17, wherein receiving the network address of the device in the virtual environment comprises receiving a network address of a VM host server in the virtual environment, and wherein determining a network address associated with the virtual environment management server comprises initiating an internal command using the network address of the VM host server.

20. The computer program product of claim 17, wherein receiving the network address of the device in the virtual environment comprises receiving a network address of a VM in the virtual environment, and wherein determining the network address associated with the virtual environment management server comprises receiving, from the VM, the network address associated with the virtual environment management server in response to sending to the VM a request for the network address associated with the virtual environment management console.

* * * * *